United States Patent
Yasui et al.

(10) Patent No.: US 9,184,426 B2
(45) Date of Patent: Nov. 10, 2015

(54) BATTERY CONNECTION MEMBER AND BATTERY MODULE USING THE SAME

(75) Inventors: Shunsuke Yasui, Osaka (JP); Hiroshi Takasaki, Osaka (JP); Toshiki Itoi, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 13/119,640

(22) PCT Filed: Jul. 9, 2010

(86) PCT No.: PCT/JP2010/004488
§ 371 (c)(1),
(2), (4) Date: Mar. 17, 2011

(87) PCT Pub. No.: WO2011/007535
PCT Pub. Date: Jan. 20, 2011

(65) Prior Publication Data
US 2011/0177365 A1 Jul. 21, 2011

(30) Foreign Application Priority Data

Jul. 17, 2009 (JP) .................................. 2009-168518

(51) Int. Cl.
*H01M 10/42* (2006.01)
*H01M 2/10* (2006.01)
(Continued)

(52) U.S. Cl.
CPC ............ *H01M 2/105* (2013.01); *H01M 2/1252* (2013.01); *H01M 2/204* (2013.01); *H01M 2/206* (2013.01); *H01M 2/34* (2013.01); *H01M 2/348* (2013.01); *H01M 10/0525* (2013.01);
(Continued)

(58) Field of Classification Search
USPC .......................................................... 429/61
See application file for complete search history.

(56) References Cited

U.S. PATENT DOCUMENTS 5,419,983 A * 5/1995 Suzuki et al. ..................... 429/7
6,111,387 A 8/2000 Kouzu et al.
(Continued)

FOREIGN PATENT DOCUMENTS

CN 2935488 Y 8/2007
EP 0 570 590 11/1993
(Continued)

OTHER PUBLICATIONS

Chinese Seach Report issued in Application No. 201080004184.9 dated Oct. 15, 2013.
(Continued)

*Primary Examiner* — Ula C Ruddock
*Assistant Examiner* — Daniel Gatewood
(74) *Attorney, Agent, or Firm* — McDermott Will & Emery LLP

(57) ABSTRACT

A battery connection member 25 configured to connect a plurality of batteries 29 in parallel includes a main conductive path portion 25a and a plurality of connection terminals 25b each configured to connect the main conductive path portion 25a to one of electrodes of each battery 29. The connection terminals 25b include fuse portions 25c configured to be blown when a current equal to or higher than a predetermined value flows. When the plurality of batteries 29 are connected in parallel by the battery connection member 25, the fuse portions 25c are arranged in space between the main conductive path portion 25 and the batteries 29.

7 Claims, 6 Drawing Sheets

(51) Int. Cl.
  *H01M 2/12* (2006.01)
  *H01M 2/20* (2006.01)
  *H01M 2/34* (2006.01)
  *H01M 10/0525* (2010.01)

(52) U.S. Cl.
  CPC ..... *H01M2200/00* (2013.01); *H01M 2200/103* (2013.01); *Y02T 10/7011* (2013.01)

(56) References Cited

U.S. PATENT DOCUMENTS

| | | | |
|---|---|---|---|
| 6,410,184 | B1 | 6/2002 | Horiuchi et al. |
| 2003/0095369 | A1* | 5/2003 | Knoedgen ............ 361/104 |
| 2003/0146734 | A1 | 8/2003 | Kozu et al. |
| 2005/0084752 | A1* | 4/2005 | Kim ............ 429/185 |
| 2006/0170394 | A1 | 8/2006 | Ha et al. |
| 2007/0120526 | A1 | 5/2007 | Kumeuchi et al. |
| 2007/0188147 | A1 | 8/2007 | Straubel et al. |
| 2008/0241667 | A1* | 10/2008 | Kohn et al. ............ 429/159 |

FOREIGN PATENT DOCUMENTS

| | | | |
|---|---|---|---|
| JP | 06-231748 | | 8/1994 |
| JP | 06231748 A | * | 8/1994 |
| JP | 10-050281 | | 2/1998 |
| JP | 10050281 A | * | 2/1998 |
| JP | 10-270006 | | 10/1998 |
| JP | 2000-223095 | | 8/2000 |
| JP | 2000-223165 | | 8/2000 |
| JP | 2002-025510 | | 1/2002 |
| JP | 2009-231138 | | 10/2009 |
| JP | 2009231138 A | * | 10/2009 |
| WO | 2007095327 A2 | | 8/2007 |

OTHER PUBLICATIONS

European Search Report issued in European Patent Application No. 10799599.5 dated Feb. 1, 2012.

* cited by examiner (a)

(b)

BATTERY CONNECTION MEMBER AND BATTERY MODULE USING THE SAME

RELATED APPLICATIONS

This application is the U.S. National Phase under 35 U.S.C. §371 of International Application No. PCT/JP2010/004488, filed on Jul. 9, 2010, which in turn claims the benefit of Japanese Application No. 2009-168518, filed on Jul. 17, 2009, the disclosures of which Applications are incorporated by reference herein.

TECHNICAL FIELD

The present invention relates to battery connection members configured to connect a plurality of batteries in parallel and battery modules using the same.

BACKGROUND ART

In recent years, in view of savings in resources and conservation of energy, there have been increasing demands for nickel-hydrogen secondary batteries, nickel-cadmium secondary batteries, lithium ion secondary batteries, etc. which can be used repeatedly. Among them, lithium ion secondary batteries are characterized by lightness in weight, high electromotive force, and high energy density. Thus, there are growing demands for the lithium ion secondary batteries as power sources for driving various kinds of mobile electronic devices and portable communication devices such as mobile phones, digital cameras, video cameras, and laptop personal computers.

On the other hand, to reduce used amount of fossil fuel, and to reduce the amount of emission of $CO_2$, expectations for battery modules are growing to serve as power sources for driving motors such as vehicles. Such a battery module includes two or more batteries to obtain a preferable voltage and preferable capacity.

In development of the battery module, along with the safety of batteries themselves, the safety of the battery module which is a collection of the batteries becomes more important. That is, a battery may lose its function as a battery due to over-charge, over-discharge, an internal short-circuit, or an external short-circuit. Moreover, the internal pressure of a battery may be increased by gas generated due to over-charge, over-discharge, an internal short-circuit, or an external short-circuit, which may possibly break an outer case of the battery. Thus, in the battery module in which a plurality of batteries is integrated, it is important to prevent the performance of the entirety of the battery module from being degraded due to a problem in one battery.

As a means to address the problems as described above, for example, a battery module in which a portion connecting batteries to each other is provided with a temperature sensor configured to break the connection when a current equal to or higher than a predetermined value flows is disclosed (for example, PATENT DOCUMENT 1). Moreover, a battery module including a fuse formed between batteries connected in series by a metal interconnect printed on an insulating substrate is disclosed (for example, PATENT DOCUMENT 2).

CITATION LIST

Patent Document

PATENT DOCUMENT 1: Japanese Patent Publication No. H10-50281

PATENT DOCUMENT 2: Japanese Patent Publication No. 2002-25510

SUMMARY OF THE INVENTION

Technical Problem

However, according to PATENT DOCUMENT 1 and PATENT DOCUMENT 2, the temperature sensor and the fuse are provided between the plurality of batteries connected in series, so that when a problem occurs in any one of the batteries, the entirety of the battery module immediately stop working. Therefore, batteries having no problem may go to waste. Moreover, since the temperature sensor and the fuse themselves are large in size, they may occupy large space when installed in the battery module, which may make the battery module difficult to be miniaturized.

Moreover, in battery modules including a plurality of batteries connected in parallel, when a battery no longer generates power due to, for example, an internal short-circuit, the battery acts as a resistor, and an overcurrent flows in the battery, which may deteriorate the performance of the entirety of the battery module.

The present invention was devised to solve the above problems. It is an object of the present invention to provide a battery connection member, and a battery module using the same, wherein in the battery module including a plurality of batteries connected in parallel, the battery connection member can prevent significant performance degradation of the entirety of the battery module due to a battery having a problem such as an internal short-circuit.

Solution to the Problem

A battery connection member according to the present invention is a battery connection member for connecting a plurality of batteries in parallel, and includes a main conductive path portion, and a plurality of connection terminals each configured to connect the main conductive path portion to one of electrodes of the corresponding battery, wherein the connection terminals have fuse portions configured to be blown when a current equal to or higher than a predetermined flows. Then, when a plurality of batteries is connected in parallel by the battery connection member according to the present invention, the fuse portions are arranged in space between the main conductive path portion and the batteries.

With this configuration, even when a problem due to an internal short-circuit, or the like occurs in a battery, it is possible to break only the connection terminal to the battery having the problem. Thus, the performance of the other connected batteries can be free from the influence of the battery having the problem. Moreover, when a plurality of batteries is connected in parallel by the battery connection member, the fuse portions are arranged in space between the main conductive path portion and the batteries. Thus, it is possible to reduce dissipation of Joule heat generated when an overcurrent flows in the fuse portions. This facilitates the design of the fuse portions configured to be blown due to a temperature rise caused by Joule heat, and can reduce design variations. Further, it is possible to reduce a thermal influence of the temperature rise caused by the Joule heat over the other batteries and the connecting member.

A battery module according to the present invention is a battery module including a plurality of batteries placed in a housing, wherein the plurality of batteries is connected in parallel by a battery connection member, the battery connection member includes a main conductive path portion and a plurality of connection terminals each configured to connect the main conductive path portion to one of electrodes of the corresponding battery, the connection terminals include fuse portions configured to be blown when a current equal to or higher than a predetermined value flows, and the fuse portions are arranged in space between the main conductive path portion and the batteries.

With this configuration, even when a problem due to an internal short-circuit, or the like occurs in a battery, it is possible to disconnect only the battery having the problem. Thus, in a battery module including a plurality of batteries connected in parallel, it is possible to prevent performance degradation of the entirety of the battery module.

Advantages of the Invention

The present invention can provide a battery connection member and a battery module using the same, wherein even when a problem such as an internal short-circuit occurs in a battery, the battery connection member can disconnect only the battery having the problem.

DESCRIPTION OF EMBODIMENTS

Figure 1:
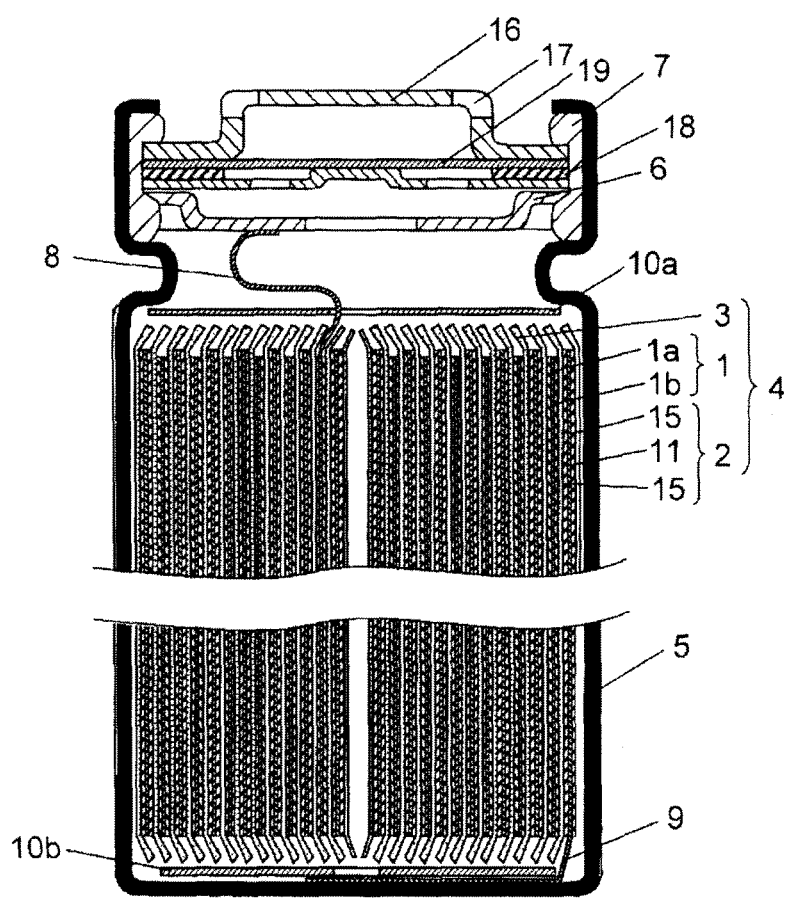
FIG. 1 is a cross-sectional view illustrating a battery included in a battery module of a first embodiment of the present invention.

A battery connection member of an embodiment of the present invention is a battery connection member configured to connect a plurality of batteries in parallel, and includes a main conductive path portion, and a plurality of connection terminals each configured to connect the main conductive path portion to one of electrodes of the corresponding battery. The connection terminals include fuse portions configured to be blown when a current equal to or higher than a predetermined value flows. Also, when a plurality of batteries is connected in parallel by the battery connection member, the fuse portions are arranged in space between the main conductive path portion and the batteries.

With this configuration, even when a problem due to an internal short-circuit, or the like occurs in a battery, it is possible to break only the connection terminal to the battery having the problem. Thus, the performance of the other connected batteries can be free from the influence of the battery having the problem. Moreover, when a plurality of batteries is connected in parallel by the battery connection member, the fuse portions are arranged in space between the main conductive path portion and the batteries. Thus, it is possible to reduce dissipation of Joule heat generated when an overcurrent flows in the fuse portions. This facilitates the design of the fuse portions configured to be blown due to a temperature rise caused by Joule heat, and can reduce design variations. Moreover, it is possible to reduce heat influence of the temperature rise caused by Joule heat over the other batteries and the connecting member.

Here, it is preferable that the fuse portions be monolithically made of the same material as the connection terminals. Moreover, it is preferable that the connection terminals be monolithically made of the same material as the main conductive path portion. In this case, the cross-sectional area of the fuse portions of the connection terminals may be smaller than that of the other portions of the connection terminals. For example, when the connection terminals have a uniform width, the thickness of the fuse portions of the connection terminals may be smaller than that of the other portions of the connection terminals. With this configuration, the fuse portions can be configured easily, so that it is possible to obtain a low-cost, small-size battery connection member.

Alternatively, in another embodiment, the resistance of a material of the fuse portions of the connection terminals may be larger than that of a material of the other portions of the connection terminals. Alternatively, the fuse portions may be made of chip fuses. With this configuration, it is possible to obtain a low-cost, small-size battery connection member.

A battery module of an embodiment of the present invention is a battery module including a plurality of batteries placed in a housing, wherein the plurality of batteries is connected in parallel by a battery connection member, the battery connection member includes a main conductive path portion and a plurality of connection terminals each configured to connect the main conductive path portion to one of electrodes of the corresponding battery, the connection terminals have fuse portions configured to be blown when a current equal to or higher than a predetermined value flows, and the fuse portions are arranged in space between the main conductive path portion and the batteries.

With this configuration, even when a problem due to an internal short-circuit, or the like occurs in a battery, it is possible to disconnect only the battery having the problem. Thus, in a battery module including a plurality of batteries connected in parallel, it is possible to prevent the performance degradation of the entirety of the battery module.

Here, it is preferable that the fuse portions be monolithically made of the same material as the connection terminals. Moreover, it is preferable that the connection terminals be monolithically made of the same material as the main conductive path portion.

Moreover, the cross-sectional area of the fuse portions of the connection terminals is preferably smaller than that of the other portions of the connection terminals. For example, when the connection terminals have a uniform width, the thickness of the fuse portions of the connection terminals may be smaller than that of the other portions of the connection terminals.

Alternatively, the resistance of a material of the fuse portions of the connection terminals may be larger than that of a material of the other portions of the connection terminals. Alternatively, the fuse portions may be made of chip fuses.

Embodiments of the present invention will be described below in detail with reference to the drawings. The present invention is not limited to the following embodiments. The embodiments can accordingly be modified without deviating from the effective scope of the present invention, and can be combined with other embodiments.

First Embodiment

FIG. 1 is a cross-sectional view illustrating a battery included in a battery module of a first embodiment of the present invention.

In FIG. 1, the battery in a cylindrical shape includes an electrode group 4 in which a positive electrode 1 provided with a positive electrode lead 8 made of, for example, aluminum, and a negative electrode 2 one end of which is provided with a negative electrode lead 9 made of, for example, copper are wound with a separator 3 interposed therebetween. Then, insulating plates 10a, 10b are installed above and below the electrode group 4, and the electrode group 4 with the insulating plates 10a, 10b is inserted in a battery case 5. The other end of the positive electrode lead 8 is welded to a sealing plate 6, and the other end of the negative electrode lead 9 is welded to a bottom of the battery case 5. Further, a nonaqueous electrolyte (not shown) capable of conducting lithium ions is injected in the battery case 5. An opening portion of the battery case 5 is sealed by being crimped to a positive electrode cap 16, a current cutoff member 18 such as a PTC element, and the sealing plate 6 with a gasket 7 interposed between the opening portion and the members 16, 18, and 6. Moreover, the positive electrode cap 16 is provided with a vent 17 to release gas resulted from opening of a vent mechanism 19 such as a safety valve due to a problem in the electrode group 4. Then, the positive electrode 1 includes a positive electrode current collector 1a and a positive electrode layer 1b containing a positive electrode active material.

Here, the positive electrode layer 1b contains, as the positive electrode active material, for example, a lithium-containing compound oxide such as $LiCoO_2$, $LiNiO_7$, $Li_2MnO_4$, a mixture of these materials, or a complex compound of these materials. The positive electrode layer 1b further contains a conductive agent and a binder. Examples of the conductive agent include graphites such as natural graphite and artificial graphite, and carbon blacks such as acetylene black, ketjen black, channel black, furnace black, lamp black, and thermal black. Examples of the binder include PVDF, polytetrafluoroethylene, polyethylene, polypropylene, an aramid resin, polyamide, polyimide, etc.

Moreover, as the positive electrode current collector 1a used for the positive electrode 1, aluminum (Al), carbon (C), or a conductive resin can be used.

As the nonaqueous electrolyte, an electrolyte solution obtained by dissolving a solute in an organic solvent, or a so-called polymer electrolyte layer including the electrolyte solution solidified by macromolecules can be used. As the solute of the nonaqueous electrolyte, $LiPF_6$, $LiBF_4$, $LiClO_4$, $LiAlCl_4$, $LiSbF_6$, LiSCN, $LiCF_3SO_3$, $LiN(CF_3CO_2)$, $LiN(CF_3SO_2)_2$, or the like can be used. Furthermore, as the organic solvent, for example, ethylene carbonate (EC), propylene carbonate, butylene carbonate, vinylene carbonate, dimethyl carbonate (DMC), diethyl carbonate, ethyl methyl carbonate (EMC), or the like can be used.

Moreover, a negative electrode current collector 11 of the negative electrode 2 can be metal foil made of stainless steel, nickel, copper, titanium, or the like, or thin film made of carbon or a conductive resin.

Furthermore, as negative electrode layers 15 of the negative electrode 2, a negative electrode active material, e.g., silicon (Si), tin (Sn), or a carbon material such as graphite, which is capable of reversibly inserting and extracting lithium ions, and has a theoretical capacity density of 833 mAh/cm³ or higher can be used.

A battery module of the first embodiment of the present invention will be described below with reference to FIGS. 2A, 2B, and 3.

Figure 2:
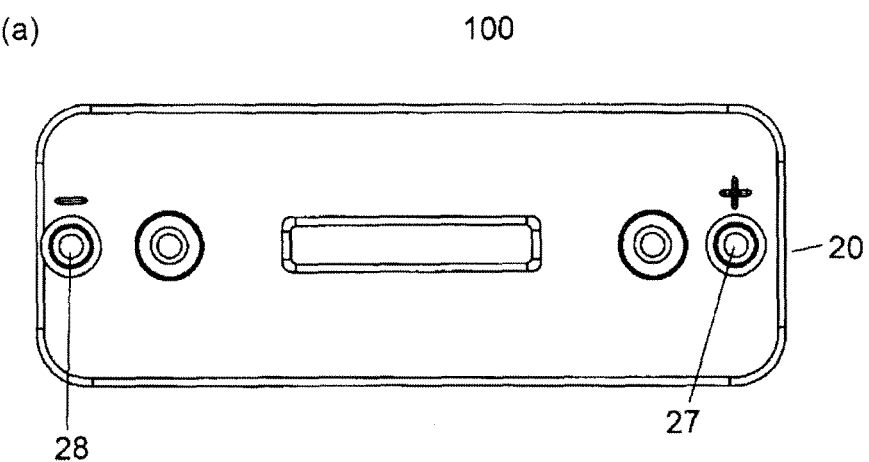
FIG. 2A is a top view illustrating the exterior of the battery module of the first embodiment of the present invention.
FIG. 2B is a side view illustrating the exterior of the battery module of the first embodiment of the present invention.
Figure 2:
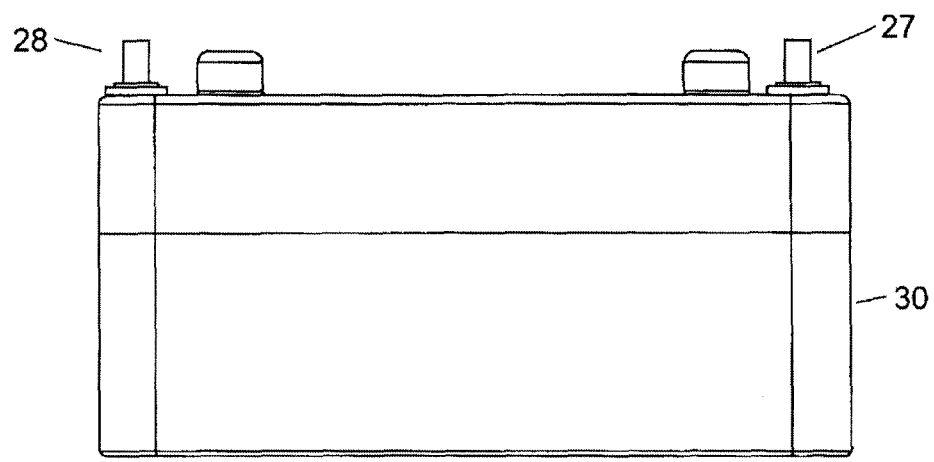

FIG. 2A is a top view illustrating the exterior of a battery module 100 of the first embodiment of the present invention. FIG. 2B is a side view illustrating the exterior of the battery module 100 of the first embodiment of the present invention. FIG. 3 is an exploded perspective view illustrating the battery module of the first embodiment of the present invention.

Figure 3:
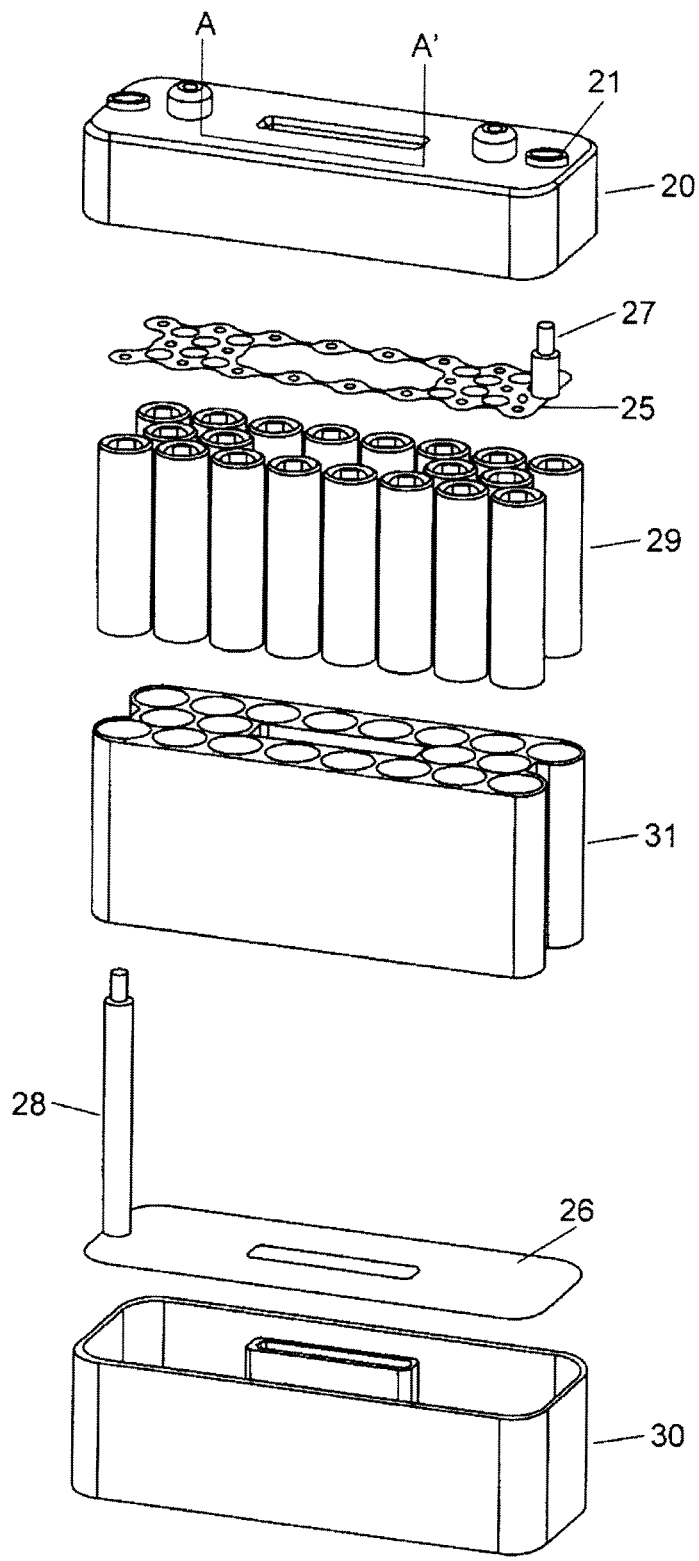
FIG. 3 is an exploded perspective view illustrating the battery module of the first embodiment of the present invention.

In FIGS. 2A, 2B and 3, the battery module 100 includes a housing 30 made of, for example, an insulating resin material such as a polycarbonate resin, and a lid body 20 fitting into the housing 30. The housing 30 has an opening end on one face (an upper face in FIG. 3). The lid body 20 is provided to cover the opening end of the housing 30. In space created by the housing 30 and the lid body 20, a partition wall 31 is provided. In the housing 30 partitioned by the partition wall 31, batteries 29 are inserted. Here, the partition wall 31 is preferably made of metal or a highly heat-conductive member as an alternative to the metal in order to improve heat conduction for heat equalization.

The battery module 100 includes a positive electrode connection member 25 and a negative electrode connection member 26 which are battery connection members configured to connect the plurality of batteries 29 in parallel. The positive electrode connection member 25 and the negative electrode connection member 26 are made of a metal plate such as plating of Ni, Fe—Ni, or the like. The positive electrode connection member 25 is arranged to cover positive electrode faces (upper faces in FIG. 3) of the batteries 29 placed in the housing 30. On the other hand, the negative electrode connection member 26 is arranged to cover negative electrode faces (lower faces in FIG. 3) of the batteries 29. That is, the batteries 29 are individually arranged in the space fully enclosed by the partition wall 31, the positive electrode connection member 25, and the negative electrode connection member 26.

A positive electrode terminal 27 is connected to the positive electrode connection member 25. A negative electrode terminal 28 is connected to the negative electrode connection member 26. The positive electrode terminal 27 and the negative electrode terminal 28 are exposed from holes 21 formed in an upper face of the lid body 20.

Figure 4:
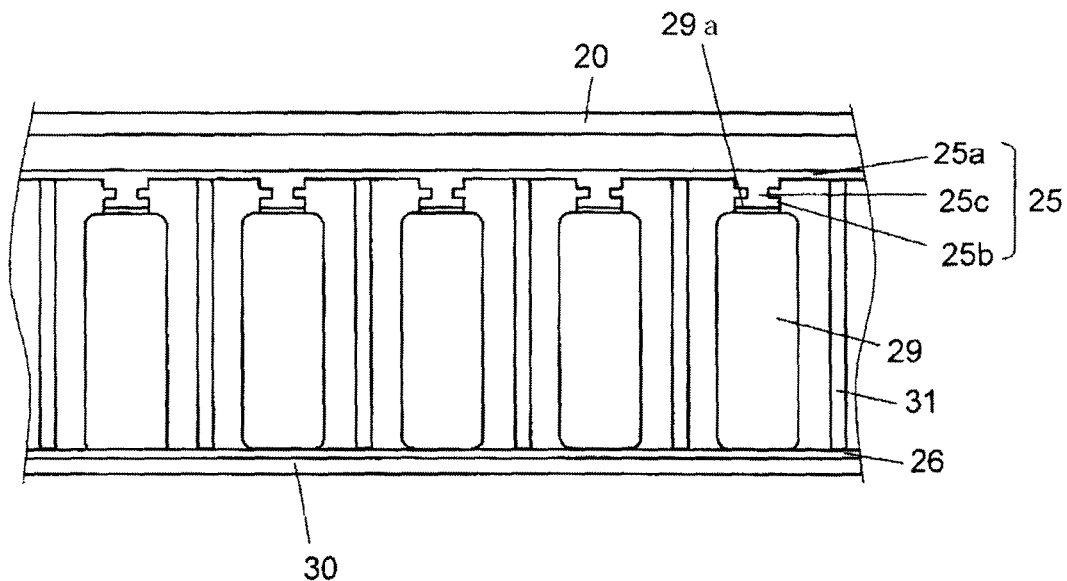
FIG. 4 is a vertical cross-sectional view illustrating the battery module of the first embodiment of the present invention taken along A-A' of FIG. 3.
Figure 5:
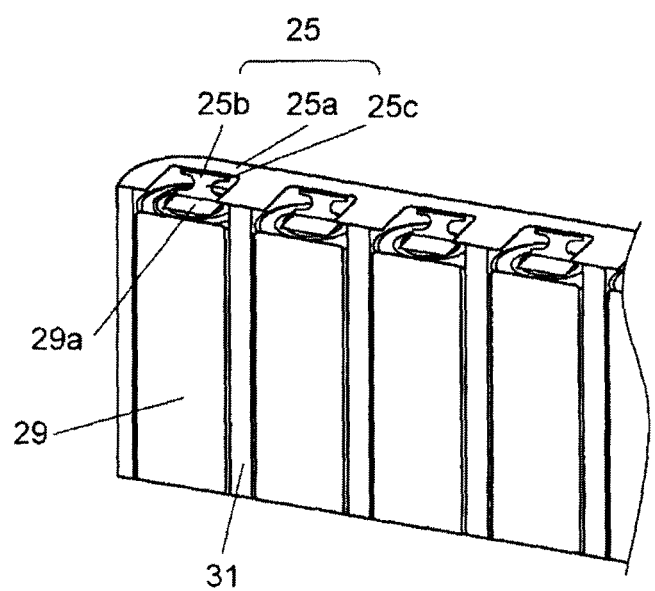
FIG. 5 is a perspective cross-sectional view illustrating main part of the battery module of the first embodiment of the present invention.

A connection structure of batteries of the battery module 100 will be described in detail below with reference to FIGS. 4 and 5. FIG. 4 is a vertical cross-sectional view along the plane A-A' of FIG. 3. FIG. 5 is a perspective cross-sectional view illustrating main part of a connection portion of the battery module 100.

In FIG. 4, the batteries 29 are arranged in the space surrounded by the partition wall 31, the positive electrode connection member 25, and the negative electrode connection member 26. The positive electrode connection member 25 is made of a flat metal plate, and includes a main conductive path portion 25a and a connection terminal 25b. The connection terminal 25b includes a plurality of connection terminals 25b so that the batteries 29 are individually connected to the positive electrode connection member 25. There is space between the positive electrode connection member 25 and positive electrodes 29a of the batteries 29. The connection terminals 25b protrude from the main conductive path portion 25a into the space. Each of the connection terminals 25b includes a fuse portion 25c. The fuse portion 25c is formed in such a manner that the cross-sectional area of a portion of the connection terminal 25b is smaller than that of the other portions of the fuse portion 25b. For example, when the connection terminal 25b has a uniform thickness, the width of the fuse portion 25c of the connection terminal 25b is smaller than that of the other portions of the connection terminal 25b. With this configuration, the resistance of the fuse portion 25c is higher than that of the other portions, and thus the fuse portion 25c forms a current fuse configured to be blown when a current equal to or higher than a predetermined value flows.

A temperature rise ΔT caused by Joule heat (E) after time t from a start of flowing of a current (1) in the fuse portion 25c is given by the following expression (1), where A is the cross-sectional area of the fuse portion 25c, and L is the length of the fuse portion 25c.

$$\Delta T = E/(Cp \cdot M) \qquad \text{expression (1)}$$
$$= (I^2 \cdot R \cdot t)/(Cp \cdot \rho \cdot A \cdot L)$$
$$= (I^2 \cdot r \cdot L/A \cdot t)/(Cp \cdot \rho \cdot A \cdot L)$$
$$= (I^2 \cdot r \cdot t)/(Cp \cdot \rho \cdot A^2)$$

where Cp is specific heat capacity, M is mass, R is resistance, ρ is density, L is length, and r is electrical resistivity. Note that as can be seen from expression (1), the temperature rise ΔT is independent of the length (L) of the fuse portion 25c.

When an internal short-circuit occurs, a current flowing in the battery is about 70 A, where the internal resistance of the battery is 50 mΩ In practice, the current flowing in the battery having the internal short-circuit increases to several times the above value because short-circuit currents from neighboring batteries also flow in the battery. On the condition that a current flowing in the battery having the internal short-circuit is 300 A when a current during ordinary use is 10 A-50 A, if the cross-sectional area (A) of the fuse portion 25c is 1 mm² in the case of the positive electrode connection member 25 made of Ni, the temperature rise caused by Joule heat at the fuse portion 25c after 1 second is about 1600° C. according to expression (1), and the fuse portion 25c is blown because the melting point of Ni is 1455° C. That is, if the cross-sectional area (A) of the fuse portion 25c is less than or equal to 1 mm², the fuse portion 25c is blown when an abnormal current which is 10 or more times a normal current occurs. Moreover, when the cross-sectional areas of the main conductive path portion 25a and each connection terminal 25b are greater than or equal to 2 mm², which is two or more times the cross-sectional area of each fuse portion 25c, the temperature rise caused by Joule heat is about 400° C. or less, which is less than or equal to ¼ of the above value, according to expression (1).

Operation of the battery module of the present embodiment and operation of the battery module when a problem occurs in a battery will be described below with reference to FIGS. 4 and 6.

First, with reference to FIG. 4, a normal current flow in the battery module will be described. A current flowing in the positive electrode connection member 25 which is connected to the positive electrode terminal 27 connected to an external circuit (not shown) uniformly flows in the main conductive path portion 25a which is lower in resistance than the batteries 29, and then passes through the connection terminals 25b to the plurality of batteries 29. Next, the current flows in the negative electrode connection member 26, and then flows from the negative electrode terminal 28 to the external circuit.

However, in such a configuration, when a problem such as an internal short-circuit occurs in one of the plurality of batteries 29 connected in parallel, a current equal to or higher than a predetermined value flows in the battery having the internal short-circuit, which may cause a serious problem such as performance degradation of the entirety of the battery module.

Figure 6:
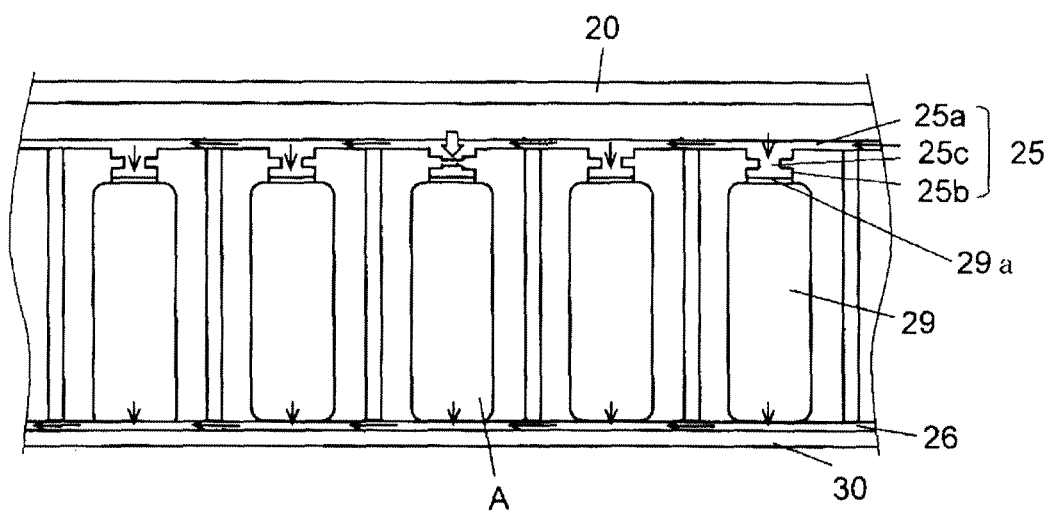
FIG. 6 is a vertical cross-sectional view illustrating operation of a battery of the battery module of the first embodiment of the present invention along the plane A-A' of FIG. 3, where the battery has a problem.

With reference to FIG. 6, operation of the battery module of the present embodiment when a problem occurs in a battery will be described. FIG. 6 is a vertical cross-sectional view along the plane A-A' of FIG. 3, and shows the case where a problem occurs in a battery. Moreover, arrows in FIG. 6 represent a current flow.

In FIG. 6, a current equal to or higher than a predetermined value flows from the main conductive path portion 25a through the connection terminal 25b toward Battery A having a problem such as an internal short-circuit as described above. In such a case, the present embodiment is configured such that the fuse portion 25c provided at the connection terminal 25b is blown.

In detail, the fuse portions 25c are formed at portions of the connection terminals 25b exposed in space between the positive electrode connection member 25 and the positive electrodes 29a of the batteries 29 so that the resistance of the fuse portions 25c is higher than that of the other portions of the connection terminals 25b. In the present embodiment, each fuse portion 25c is formed in such a manner that the width of a portion of the connection terminal 25b is smaller than that of the other portions of the connection terminal 25b. For this reason, when a current equal to or higher than a predetermined value flows in the fuse portion 25c, high heat is generated, so that the fuse portion 25c is blown. In this way, the connection between the positive electrode connection member 25 and Battery A having a problem is broken. Thus, even when a problem occurs in Battery A of the plurality of batteries 29 connected in parallel, it is possible to disconnect Battery A from the positive electrode connection member 25, so that the other normally operating batteries 29 can continue operating without being influenced by Battery A having the problem. Therefore, it is possible to prevent the performance degradation of the entirety of the battery module.

Moreover, since the connection terminals 25b are provided in the space between the positive electrode connection member 25 and the positive electrodes 29a of the batteries 29, it is possible to easily address design variations when the connection terminals 25b are provided with the fuse portions 25c. Further, the fuse portion 25c has high heat when being blown, but the influence of the heat over the other batteries, the positive electrode connection member 25, and the like can be limited to a lower degree because the fuse portion 25c is exposed in the space.

Furthermore, since the fuse portions 25c are formed as a part of the connection terminals 25b, it is possible to downsize the fuse portions 25c, and the cost of materials can be reduced. Thus, the battery module itself can be downsized.

Note that each fuse portion 25c in the present embodiment is formed in such a manner that the width of a portion of the connection terminal 25b is smaller than that of the other portions of the connection terminal 25b, but alternatively, for example, each fuse portion 25c may be formed in such a manner that the thickness of a portion of the connection terminal 25b is smaller than that of the other potions of the connection terminal 25b. Alternatively, each fuse portion 25c may be formed in such a manner that the resistance of a material of a portion of the connection terminal 25b is higher than that of a material of the other portions of the connection terminal 25b. Alternatively, the connection terminals 25b themselves may form the fuse portions 25c. Alternatively, the fuse portions 25c may be chip fuses which can be mounted on a substrate.

Moreover, in the present embodiment, the positive electrode connection member 25 is made of a metal plate such as plating of Ni, or Fe—Ni, but may be made of plating of other materials such as Cu or Al. Alternatively, the positive electrode connection member 25 may be configured by forming interconnects made of such a metal on a substrate to provide the main conductive path portion 25a and the connection terminals 25b. Alternatively, the positive electrode connection member 25 may be configured by, for example, using chip fuses which can be mounted on a substrate as the fuse portions 25c, and mounting the chip fuses on the substrate.

Figure 7:
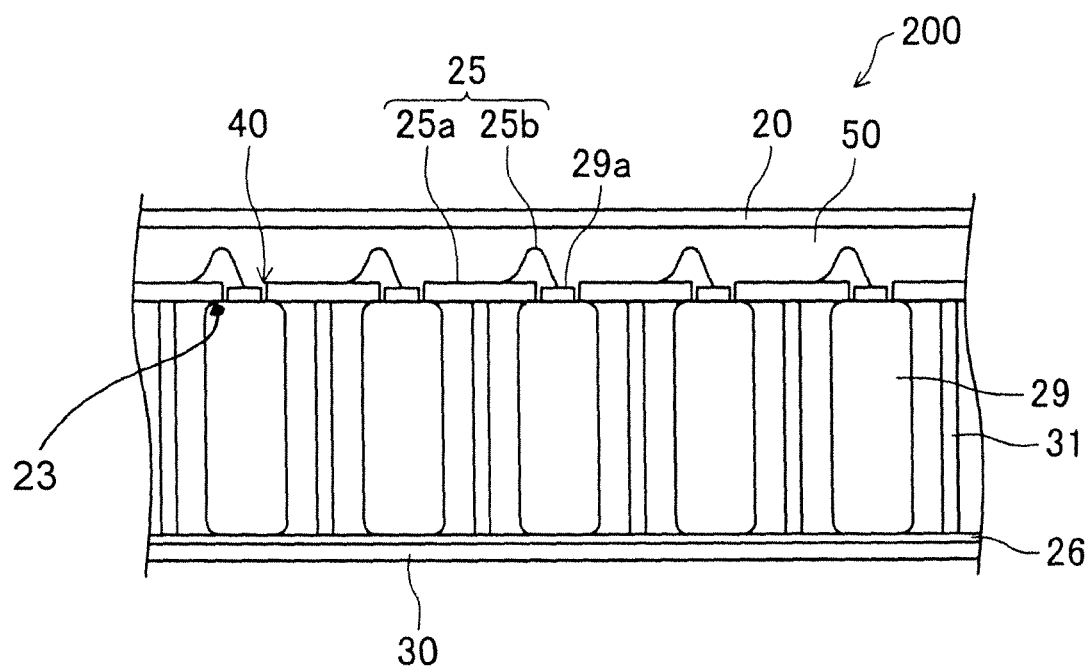
FIG. 7 is a vertical cross-sectional view illustrating a battery module of another embodiment of the present invention.
Figure 8:
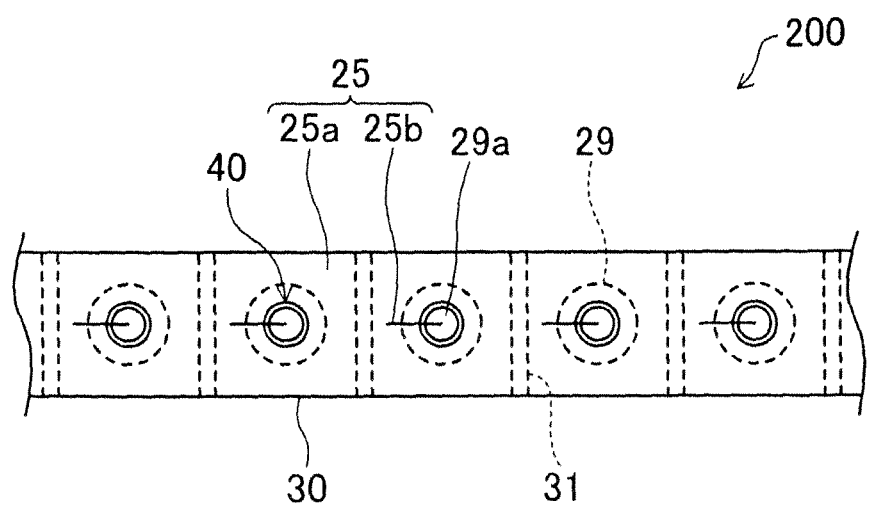
FIG. 8 is a plan view illustrating the battery module of the another embodiment of the present invention.

FIGS. 7 and 8 are views illustrating a configuration of a battery module 200 of another embodiment of the present invention, where FIG. 7 is a cross-sectional view, and FIG. 8 is a plan view without a lid body.

As illustrated in FIGS. 7 and 8, a plurality of batteries 29 are placed in a housing 30, and batteries 29 are connected in parallel by a positive electrode connection member 25. Here, the positive electrode connection member 25 includes a main conductive path portion 25a having a plurality of through holes 40, and a plurality of connection terminals 25b each configured to connect the main conductive path portion 25a to a positive electrode 29a of each battery 29. The main conductive path portion 25a is arranged in contact with a shoulder portion 23 of each battery 29. The positive electrodes 29a of the batteries 29 are inserted in the through holes 40, respectively, provided in the main conductive path portion 25a. In this way, the battery module 200 is partitioned by the main conductive path portion 25a to have the housing 30 in which the batteries 29 are placed, and space 50 created between the main conductive path portion 25a and a lid body 20. Moreover, the housing 30 in which the batteries 29 are placed is sealed by the main conductive path portion 25a.

One end of each connection terminal 25b is connected to the positive electrode 29a of each battery 29. The other end of each connection terminal 25b passes through the through hole 40, and extends in the space 50 created above the main conductive path portion 25a, thereby being connected to a surface of the main conductive path portion 25a.

In the present embodiment, when an internal short-circuit occurs in a battery 29, the connection terminal 25b connected to the battery 29 is blown by Joule heat. That is, in the present embodiment, the connection terminals 25b themselves also serve as fuse portions 25c. Here, materials for the connection terminals 25b are not particularly limited, but can be, for example, a metal thin wire or metal ribbon made of Ni or Al. Here, when the cross-sectional area in the relational expression represented by expression (1) is set to 1 mm$^2$ so that a current flowing in the battery having an internal short-circuit is 300 A, a temperature rise caused by Joule heat at the fuse portion 25c after 1 second is about 1600° C., so that the fuse portion 25c is blown because the melting point of Ni is 1455° C. Alternatively, connection to the positive electrodes 29a and to the main conductive path portion 25a can be achieved by wire bonding, laser welding, or the like.

When an internal short-circuit occurs in the battery 29, high-temperature gas is generated in the battery 29, which increases the pressure in the battery 29, allowing operation of the vent mechanism 19 of the battery 29 as illustrated in FIG. 1, so that the high-temperature gas is released through the vent 17. Since the vent 17 is provided at the positive electrode cap 16, the high-temperature gas released through the vent 17 (not shown) is, as illustrated in FIG. 7, released through the through hole 40 to the space 50 above the main conductive path portion 25a. Therefore, the connection terminal 25b arranged above the through hole 40 is subjected to the high-temperature gas released through the vent 17. As a result, the temperature rise at the connection terminal 25b connected to the battery 29 having an internal short-circuit can be accelerate by the high-temperature gas released through the vent 17 in addition to Joule heat due to a short-circuit current. The temperature of the high-temperature gas is usually 1000° C. or higher. Thus, even when the temperature of the connection terminal 25b is not satisfactorily raised by Joule heat, a blowout of the connection terminal 25b can be ensured by subjecting the connection terminal 25b to the high-temperature gas.

Moreover, in the present embodiment, the high-temperature gas released through the vent 17 of the battery 29 having an internal short-circuit is released through the through hole 40 to the space 50 above the main conductive path portion 25a. Therefore, normally operating, neighboring batteries 29 can be prevented from being subjected to the high-temperature gas.

The present invention has been described with reference to the preferable embodiments, but the above description does not limit the present invention, and of course, various modifications can be made. For example, in the embodiments, the partition wall 31 is provided so that the housing 30 are partitioned for the plurality of batteries 29, but the battery connection member and the battery module of the present invention can provide advantages without the partition wall 31. Moreover, in the embodiments, the housing 30 may be but not limited to a configuration in which an opening end is provided on only one face of the housing 30. For example, the housing 30 may have opening ends on both faces thereof.

INDUSTRIAL APPLICABILITY

The present invention is applicable to battery modules and battery connection members in the battery modules such as vehicles, bicycles, and electronic tools which require high reliability and safety.

DESCRIPTION OF REFERENCE CHARACTERS

Positive Electrode
1a Positive Electrode Current Collector
1b Positive Electrode Layer
2 Negative Electrode
3 Separator
4 Electrode Group
5 Battery Case
6 Sealing Plate
7 Gasket
8 Positive Electrode Lead
9 Negative Electrode Lead
10a, 10b Insulating Plate
11 Negative Electrode Current Collector
15 Negative Electrode Layer
16 Positive Electrode Cap
17 Vent
18 Current Cutoff Member
19 Vent Mechanism
20 Lid Body
21 Hole
25 Positive Electrode Connection Member
25a Main Conductive Path Portion
25b Connection Terminal 25c Fuse Portion
26 Negative Electrode Connection Member
27 Positive Electrode Terminal
28 Negative Electrode Terminal
29 Battery
29a Positive Electrode
30 Housing
31 Partition Wall
40 Through Hole
50 Space
100, 200 Battery Module

The invention claimed is:

1. A battery module including a plurality of batteries placed in a housing, wherein
 the plurality of batteries are connected in parallel by a battery connection member,
 the battery connection member includes a main conductive path portion made of a flat metal plate, and a plurality of connection terminals each configured to connect the main conductive path portion to one of electrodes of each battery,
 the main conductive path portion has a plurality of through holes in each of which the one of electrodes of each battery is inserted, and the main conductive path portion is arranged in direct contact with a shoulder portion of each battery such that a first surface of the main conductive path portion faces and directly contacts each battery,
 the battery module is partitioned by the main conductive path portion to have the housing and a vent space, the vent space created between a second surface of the main conductive path portion opposite to the first surface and a lid body, where gas released from a vent provided to the one of electrodes of each battery is released to the vent space via the through hole,
 one end of each connection terminal is connected to the one of electrodes of each battery, and the other end of each connection terminal passes through the through hole, and extends in the vent space to be connected to the second surface of the main conductive path portion, and
 the connection terminals also serve as fuse portions which are blown when a current over a predetermined value flows therethrough.

2. The battery module of claim 1, wherein the main conductive path portion is a metal interconnect formed on a substrate.

3. The battery module of claim 1, wherein
 the housing is partitioned by a partition wall, and
 the first surface of the main conductive path portion is in contact with the partition wall.

4. A battery module including a plurality of batteries placed in a housing, wherein
 the housing is partitioned by a partition wall,
 each of the batteries is placed in a corresponding one of areas partitioned by the partition wall,
 the plurality of batteries are connected in parallel by a battery connection member,
 the battery connection member includes a main conductive path portion made of a flat metal plate, and a plurality of connection terminals each configured to connect the main conductive path portion to one of electrodes of each battery, the main conductive path portion having a surface which is in direct contact with each battery,
 the main conductive path portion is arranged in contact with the partition wall,
 the battery module is partitioned by the main conductive path portion to have the housing and a vent space, the vent space created between a second surface of the main conductive path portion opposite to the first surface and a lid body, where gas released from a vent provided to the one of electrodes of each battery is released to the vent space via the through hole, and
 the connection terminals also serve as fuse portions which are blown when a current over a predetermined value flows therethrough.

5. The battery module of claim 4, wherein
 the battery connection member is at least one of a positive electrode connection member or a negative electrode connection member,
 the housing is a space surrounded by the positive electrode connection member, the negative electrode connection member, and the partition wall, and
 the plurality of batteries are connected in parallel by the positive electrode connection member and the negative electrode connection member.

6. The battery module of claim 4, wherein the main conductive path portion is a metal interconnect formed on a substrate.

7. The battery module of claim 5, wherein the battery connection member is the positive electrode connection member.

* * * * *